US012566328B2

(12) United States Patent
Hozono et al.

(10) Patent No.: US 12,566,328 B2
(45) Date of Patent: Mar. 3, 2026

(54) OPTICAL SCANNING DEVICE AND IMAGE FORMING APPARATUS

(71) Applicant: KYOCERA Document Solutions Inc., Osaka (JP)

(72) Inventors: Tomohide Hozono, Osaka (JP); Yoshinobu Yoneima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 298 days.

(21) Appl. No.: 18/472,850

(22) Filed: Sep. 22, 2023

(65) Prior Publication Data

US 2024/0111149 A1     Apr. 4, 2024

(30) Foreign Application Priority Data

Sep. 29, 2022     (JP) ................................. 2022-156147
Sep. 29, 2022     (JP) ................................. 2022-156150

(51) Int. Cl.
*G02B 26/12*          (2006.01)
*G03G 15/043*        (2006.01)

(52) U.S. Cl.
CPC ....... *G02B 26/123* (2013.01); *G03G 15/0435* (2013.01)

(58) Field of Classification Search
CPC ........................... G02B 26/123; G03G 15/0435
See application file for complete search history.

(56) References Cited

U.S. PATENT DOCUMENTS

| | | | | | |
|---|---|---|---|---|---|
| 9,019,333 | B2 * | 4/2015 | Itami | .................... | G02B 26/124 |
| | | | | | 347/261 |
| 10,425,551 | B2 * | 9/2019 | Kuribayashi | .......... | G02B 26/10 |
| 2006/0023283 | A1 * | 2/2006 | Morimoto | ............ | G02B 26/126 |
| | | | | | 359/206.1 |
| 2006/0066712 | A1 * | 3/2006 | Sakai | ........................ | B41J 2/473 |
| | | | | | 347/244 |
| 2007/0058255 | A1 * | 3/2007 | Imai | ..................... | G02B 26/127 |
| | | | | | 359/566 |
| 2007/0236557 | A1 * | 10/2007 | Imai | ..................... | G02B 26/123 |
| | | | | | 359/197.1 |
| 2008/0068440 | A1 * | 3/2008 | Hirakawa | ............ | G02B 26/123 |
| | | | | | 359/201.1 |

(Continued)

FOREIGN PATENT DOCUMENTS

| | | | | | |
|---|---|---|---|---|---|
| JP | 2009-098332 A | | 5/2009 | | |
| JP | 2017-207539 A | | 11/2017 | | |
| KR | 20040106073 A | * | 12/2004 | ........ | G02B 13/0005 |

*Primary Examiner* — William Lu

(74) *Attorney, Agent, or Firm* — Stein IP, LLC

(57)          ABSTRACT

An optical scanning device includes a light source portion, a deflector, a first scanning lens, a second scanning lens, and a pair of reflection mirrors. The first scanning lens collects a light beam having been reflected by the deflector. The second scanning lens causes the light beam having passed through the first scanning lens to form an image on a circumferential surface of an image carrier. The pair of reflection mirrors, on an image formation optical path of the light beam, reflect the light beam having passed through the second scanning lens toward the image carrier. The light beam having been reflected by the pair of reflection mirrors passes between the first scanning lens and the second scanning lens to travel toward the image carrier.

9 Claims, 10 Drawing Sheets

(56)         References Cited

U.S. PATENT DOCUMENTS

| | | | |
|---|---|---|---|
| 2009/0096856 A1* | 4/2009 | Kimura | G02B 26/125 |
| | | | 347/243 |
| 2009/0231659 A1* | 9/2009 | Masuda | G02B 26/124 |
| | | | 359/221.3 |
| 2010/0328414 A1* | 12/2010 | Takahashi | B41J 2/473 |
| | | | 359/205.1 |
| 2011/0012982 A1* | 1/2011 | Arai | G02B 26/125 |
| | | | 359/212.1 |
| 2011/0063703 A1* | 3/2011 | Ishibe | G02B 26/123 |
| | | | 359/204.1 |
| 2012/0236380 A1* | 9/2012 | Miyatake | B29D 11/00 |
| | | | 359/204.1 |
| 2014/0132695 A1* | 5/2014 | Park | G02B 26/101 |
| | | | 359/206.1 |
| 2014/0160578 A1* | 6/2014 | Jibu | G02B 13/0005 |
| | | | 359/662 |
| 2015/0346487 A1* | 12/2015 | Miyatake | H04N 1/04 |
| | | | 359/204.1 |
| 2022/0026707 A1* | 1/2022 | Mashimo | G02B 26/122 |

* cited by examiner

OPTICAL SCANNING DEVICE AND IMAGE FORMING APPARATUS

This application is based on and claims the benefit of priority from Japanese Patent Applications No. 2022-156147 and No. 2022-156150, both filed on Sep. 29, 2022, the contents of which are hereby incorporated by reference.

BACKGROUND

The present disclosure relates to an optical scanning device and an image forming apparatus.

A conventional optical scanning device has a light source portion, a deflector, a first scanning lens, a second scanning lens, and a plurality of reflection mirrors. In the light source portion, a plurality of light emitting modules that emit light beams are arranged in a sub-scanning direction. The deflector rotates about an axis to reflect the light beams that have been emitted from the light source portion so as to cause the light beams to scan circumferential surfaces of image carriers in a main scanning direction. The first scanning lens collects the light beams that have been reflected by the deflector. The second scanning lens causes the light beams that have passed through the first scanning lens to form images on the circumferential surfaces of the image carriers. The reflection mirrors, on image formation optical paths of the light beams, reflect the light beams that have passed through the second scanning lens toward the image carrier.

In a case in which the conventional technology is adopted, the optical paths of the light beams that have passed through the second scanning lens become long, making the overall size of the optical scanning device disadvantageously large.

Furthermore, to make the optical paths of the beams shorter to make the scanning optical system more compact, it is necessary to increase the number of reflection mirrors to fold the optical paths of the light beams a larger number of times. As a result, the number of components is increased, so that the production cost of the optical scanning device is disadvantageously increased.

SUMMARY

According to one aspect of the present disclosure, an optical scanning device includes a light source portion, a deflector, a first scanning lens, a second scanning lens, and a pair of reflection mirrors. In the light source portion, a plurality of light emitting modules that each emit a light beam are disposed in a sub-scanning direction. The deflector rotates about an axis to reflect the light beam having been emitted from the light source portion so as to cause the light beam to scan a circumferential surface of an image carrier in a main scanning direction. The first scanning lens collects the light beam having been reflected by the deflector. The second scanning lens causes the light beam having passed through the first scanning lens to form an image on the circumferential surface of the image carrier. The pair of reflection mirrors, on an image formation optical path of the light beam, reflect the light beam having passed through the second scanning lens toward the image carrier. The light beam having been reflected by the pair of reflection mirrors passes between the first scanning lens and the second scanning lens to travel toward the image carrier.

According to another aspect of the present disclosure, an optical scanning device includes a light source portion, a deflector, a plurality of scanning lenses, and a plurality of reflection mirrors. In the light source portion, a plurality of light emitting modules that each emit a light beam are disposed in a sub-scanning direction. The deflector has a deflection surface for reflecting the light beam having been emitted from the light source portion, and rotates about an axis so as to cause the light beam to scan a circumferential surface of an image carrier in a main scanning direction. The plurality of scanning lenses extend in the main scanning direction, and cause the light beam having been reflected by the deflector to form an image on the circumferential surface of the image carrier. The plurality of reflection mirrors, on an image formation optical path of the light beam, reflect the light beam having passed through the scanning lenses toward the image carrier. The light beam is incident on the deflection surface from the sub-scanning direction obliquely with respect to a normal direction of the deflection surface, and at least one of the scanning lenses has a rib that is formed outward of an exit surface thereof for the light beam in the sub-scanning direction so as to extend in the main scanning direction. The rib has, in an end part thereof on a side of the exit surface for the light beam, a depression portion where an end surface thereof in the sub-scanning direction is curvedly depressed.

Other objects of the present disclosure, and the specific benefits obtained according to the present disclosure, will become apparent from the description of embodiments which follows.

DETAILED DESCRIPTION

Figure 1:
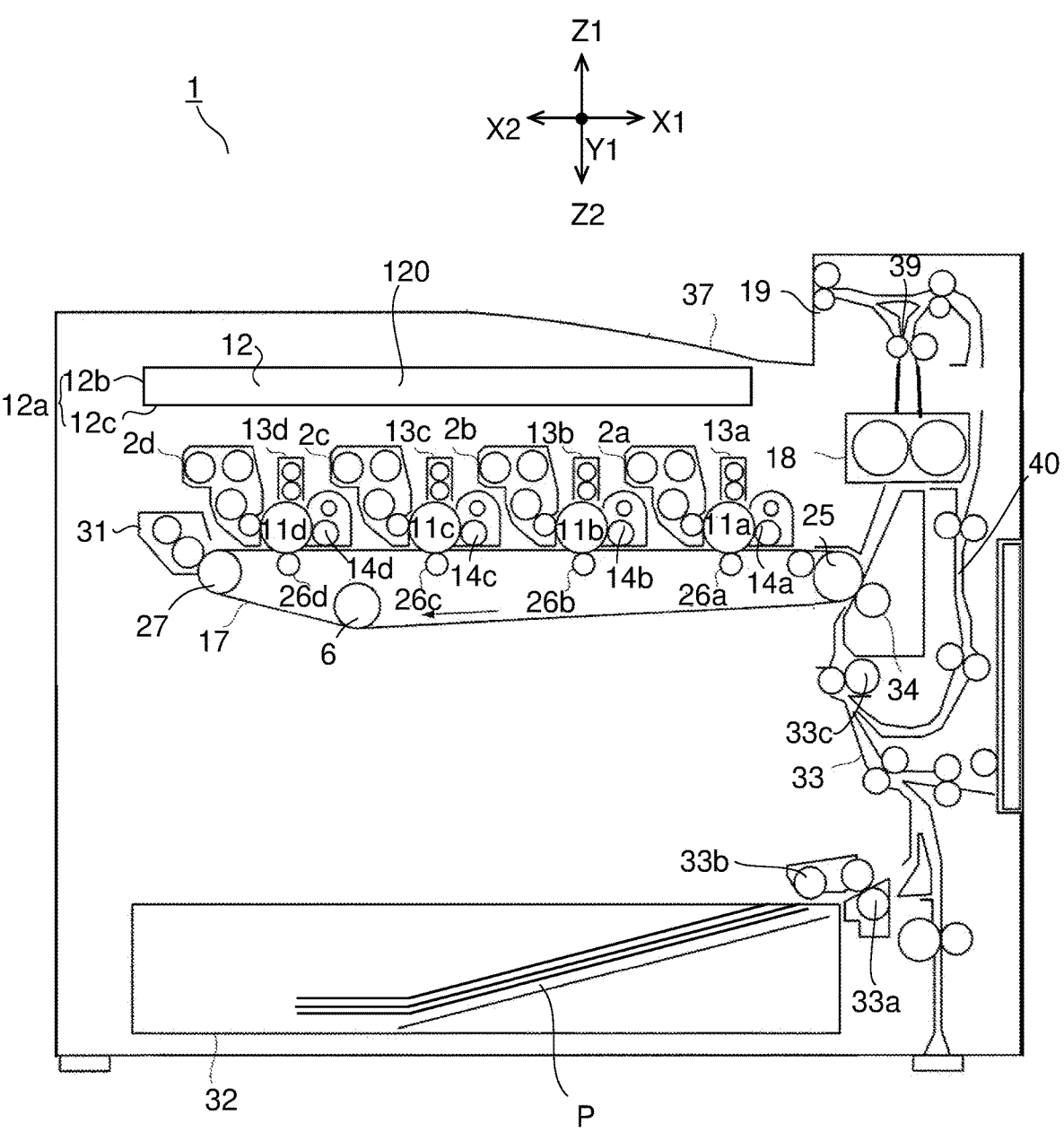
FIG. 1 is a sectional view schematically showing an overall configuration of an image forming apparatus 1 incorporating an optical scanning device 12 according to a first embodiment of the present disclosure.

Hereinafter, a first embodiment of the present disclosure will be described with reference to the accompanying drawings. FIG. 1 is a sectional view schematically showing an overall configuration of an image forming apparatus 1 incorporating an optical scanning device 12 of the present disclosure. For convenience of description, a vertical direction with the image forming apparatus 1 in an installation state in which it is ready for use (the state shown in FIG. 1) is defined as an up-down direction (a Z1-Z2 direction). Further, a front-rear direction (a Y1-Y2 direction) is defined with a face of the image forming apparatus 1 shown in FIG. 1, the face being on the near side of the sheet of FIG. 1, as a front face (front side). Further, based on the front face of the image forming apparatus 1 in the installation state, a left-right direction (an X1-X2 direction) is defined. In the present embodiment, the left-right direction (the X1-X2 direction) is orthogonal to the up-down direction (the Z1-Z2 direction) and to the front-rear direction (the Y1-Y2 direction).

The image forming apparatus 1 is a tandem-type color printer. The image forming apparatus 1 includes photosensitive drums 11a to 11d, which are rotatable, as image carriers. The photosensitive drums 11a to 11d are each formed of, for example, an organic photosensitive member (an OPC photosensitive member) on which an organic photosensitive layer is formed, or an amorphous silicon photosensitive member on which an amorphous silicon photosensitive layer is formed. The photosensitive drums 11a to 11d are disposed in a tandem manner corresponding to different colors of yellow, cyan, magenta, and black.

Around the photosensitive drum 11a, there are arranged a developing device 2a, a charger 13a, and a cleaning device 14a. Likewise, around each of the photosensitive drums 11ba to 11d, there are arranged a corresponding one of developing devices 2b to 2d, a corresponding one of chargers 13b to 13d, and a corresponding one of cleaning devices 14b to 14d. Further, above the developing devices 2a to 2d, the optical scanning device 12 is arranged.

The developing devices 2a to 2d are each disposed on a left side X2 of a corresponding one of the photosensitive drums 11a to 11d. The developing devices 2a to 2d each face the corresponding one of the photosensitive drums 11a to 11d, and each supply toner to the corresponding one of the photosensitive drums 11a to 11d. Herein, the terms "right" and "left" respectively refer to right and left in the drawings.

The chargers 13a to 13d are each disposed upstream of the corresponding one of the developing devices 2a to 2d with respect to a rotation direction of the photosensitive drums 11a to 11d, and each face a surface of the corresponding one of the photosensitive drums 11a to 11d. The chargers 13a to 13d each uniformly charge the surface of the corresponding one of the photosensitive drums 11a to 11d.

In the present embodiment, the optical scanning device 12 is disposed on an upper side Z1 of the photosensitive drums 11a to 11d. The optical scanning device 12, based on image data such as letters and patterns fed from a personal computer or the like to an image input portion, irradiates with light (optically scans) the surfaces of the photosensitive drums 11a to 11d that have been uniformly charged by the chargers 13a to 13d. As a result, electrostatic latent images are formed on the surfaces of the photosensitive drums 11a to 11d.

The optical scanning device 12 has a casing 12a that includes a housing portion 12b having a face (in the present embodiment, a lower face) thereof opened as an opening, and a cover portion 12c that covers the opening. The housing portion 12b has a scanning optical system 120 installed therein. In the cover portion 12c, there are formed emission ports (see FIG. 5) for light beams B1 to B4 emitted, corresponding to the photosensitive drums 11a to 11d, from the scanning optical system 120.

The light beams B1 to B4 are each applied to the surface of a corresponding one of the photosensitive drums 11a to 11d from a downstream side of a corresponding one of the chargers 13a to 13d with respect to the rotation direction of the photosensitive drums 11a to 11d. As a result, electrostatic latent images are formed on the surfaces of the photosensitive drums 11a to 11d. These electrostatic latent images are developed into toner images by the developing devices 2a to 2d. Regarding the optical scanning device 12, a detailed description will be given later.

An intermediate transfer belt 17, which is an endless belt, is stretched between a tension roller 6, a driving roller 25, and a driven roller 27. The driving roller 25 is caused by a motor (not shown) to rotate, and thereby drives the intermediate transfer belt 17 to circulate in a clockwise direction in FIG. 1.

The photosensitive drums 11a to 11d are arrayed on the upper side Z1 of the intermediate transfer belt 17 so as to be adjacent to each other along a conveyance direction (an arrow direction in FIG. 1). The photosensitive drums 11a to 11d are in contact with the intermediate transfer belt 17.

Primary transfer rollers 26a to 26d each face a corresponding one of the photosensitive drums 11a to 11d with the intermediate transfer belt 17 therebetween. The primary transfer rollers 26a to 26d are each pressed against the intermediate transfer belt 17 to form, together with the corresponding one of the photosensitive drums 11a to 11d, primary transfer portions. In these primary transfer portions, the toner images are transferred to the intermediate transfer belt 17.

Specifically, a primary transfer voltage is applied to each of the primary transfer rollers 26a to 26d, and thereby the toner images on the photosensitive drums 11a to 11d are sequentially transferred onto the intermediate transfer belt 17 with predetermined timing. In this manner, on a surface of the intermediate transfer belt 17, a full-color toner image is formed in which the toner images of the four colors of magenta, cyan, yellow, and black are superimposed on each other in a predetermined positional relationship.

A secondary transfer roller 34 faces the driving roller 25 with the intermediate transfer belt 17 therebetween. The secondary transfer roller 34 is pressed against the intermediate transfer belt 17 and forms, together with the driving roller 25, a secondary transfer portion. In this secondary transfer portion, a secondary transfer voltage is applied to the secondary transfer roller 34, and thereby the toner image on the surface of the intermediate transfer belt 17 is transferred onto a sheet P. After the transfer of the toner image, a belt cleaning device 31 cleans residual toner off the intermediate transfer belt 17.

In a lower part of the image forming apparatus 1, a sheet feed cassette 32 is arranged. The sheet feed cassette 32 accommodates a plurality of sheets P. On a right side X1 of the sheet feed cassette 32, a sheet conveyance path 33 is arranged.

The sheet conveyance path 33 conveys a sheet P fed out from the sheet feed cassette 32 to the secondary transfer portion. Further, inside the image forming apparatus 1, a fixing portion 18 and a sheet conveyance path 39 are arranged. The fixing portion 18 performs a fixing process with respect to the sheet P on which an image has been formed. The sheet conveyance path 39 conveys the sheet P having been subjected to the fixing process to a sheet discharge portion 37.

Sheets P stored in the paper feed cassette 32 is fed out one by one by a pick-up roller 33b and a pair of separation rollers 33a to a side of the sheet conveyance path 33.

A pair of registration rollers 33*c* covey a sheet P to the secondary transfer portion with timing coordinated with the image forming operation performed on the secondary transfer belt 17 and the operation of feeding sheet to the secondary transfer portion. Onto the sheet P having been conveyed to the secondary transfer portion, by the secondary transfer roller 34 having the secondary transfer voltage applied thereto, the full-color toner image on the intermediate transfer belt 17 is secondarily transferred. The sheet P having the full-color toner image transferred thereon is conveyed to the fixing portion 18.

The fixing portion 18 includes components such as a fixing belt that is heated by a heater, a fixing roller that is internally in contact with the fixing belt, and a pressing roller that is pressed against the fixing roller with the fixing belt therebetween. The fixing portion 18 applies heat and pressure to the sheet P having the toner image transferred thereon. In this manner, the fixing process is carried out. The sheet P having the toner image fixed thereon in the fixing portion 18 is turned upside down, as necessary, through a sheet conveyance path 40. Thereafter, the sheet P is conveyed again to the secondary transfer portion via the pair of registration rollers 33*c*, and then a new toner image is secondarily transferred onto a back side of the sheet P by the secondary transfer roller 34, and is fixed in the fixing portion 18. The sheet P having the toner image fixed thereon passes through the sheet conveyance path 39 to be discharged by a pair of discharge rollers 19 to the sheet discharge portion 37.

Figure 2:
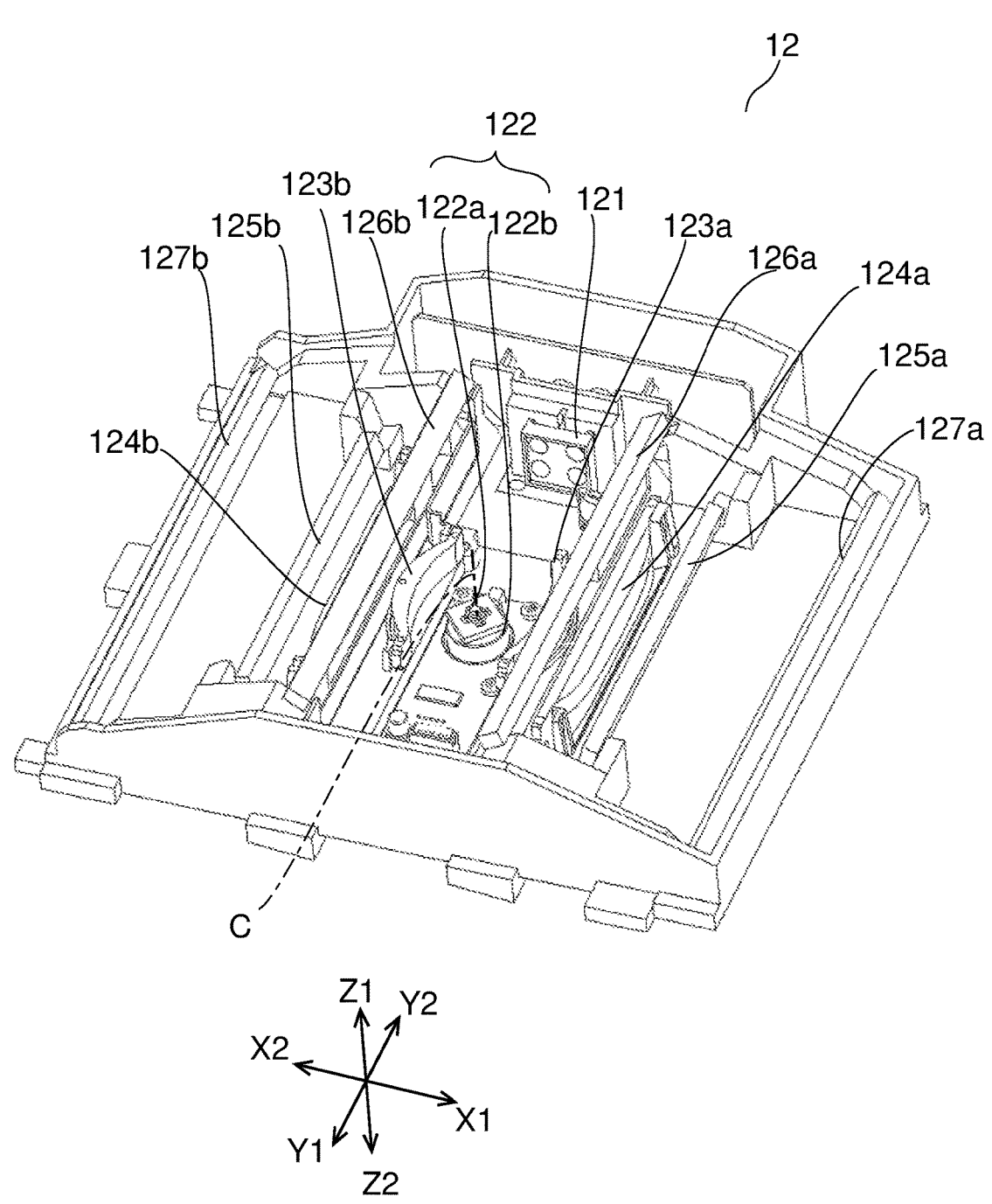
FIG. 2 is a perspective view of the optical scanning device 12 according to the first embodiment of the present disclosure.
Figure 3:
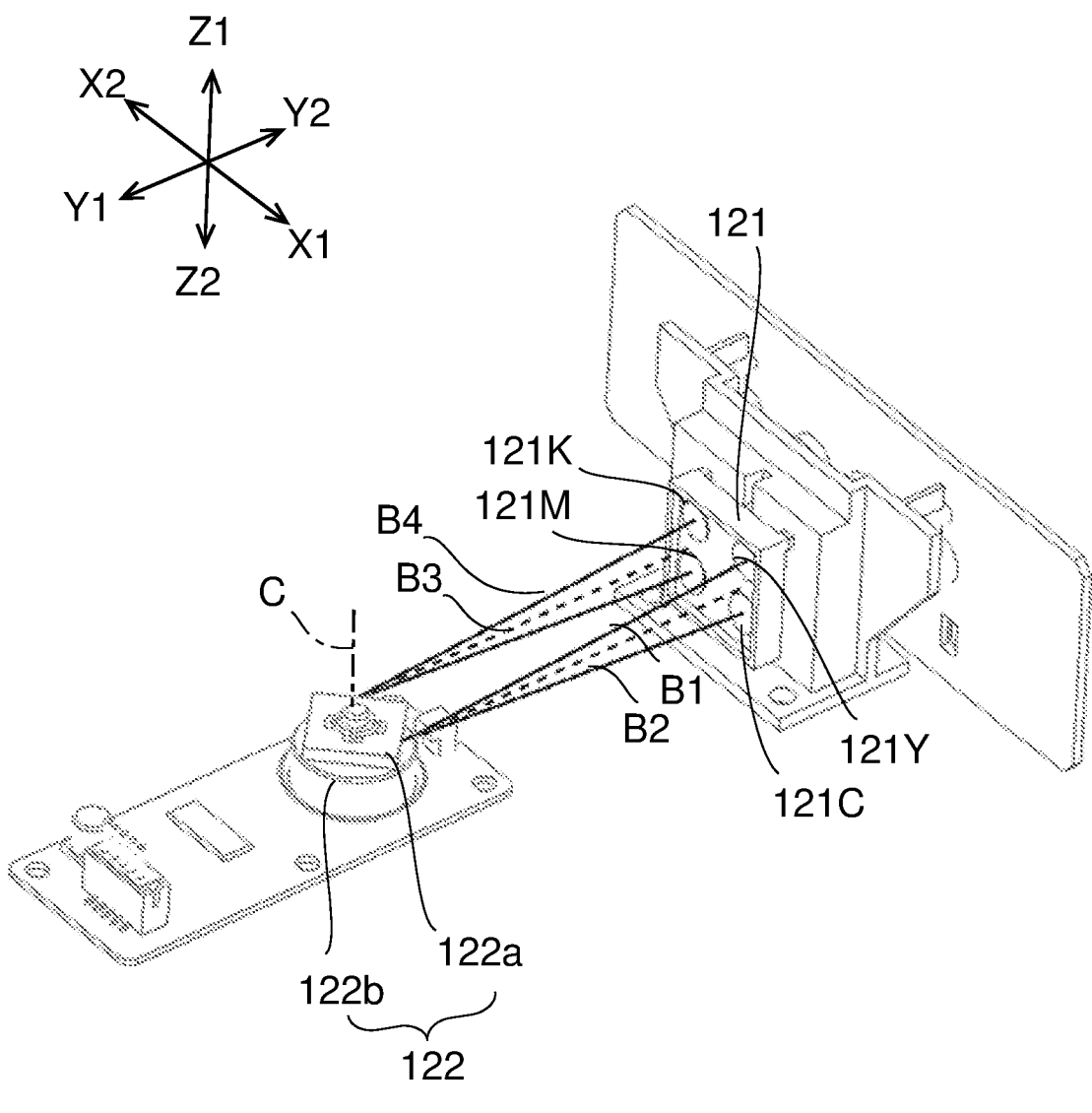
FIG. 3 is a perspective view showing part of the optical scanning device 12 according to the first embodiment of the present disclosure.
Figure 4:
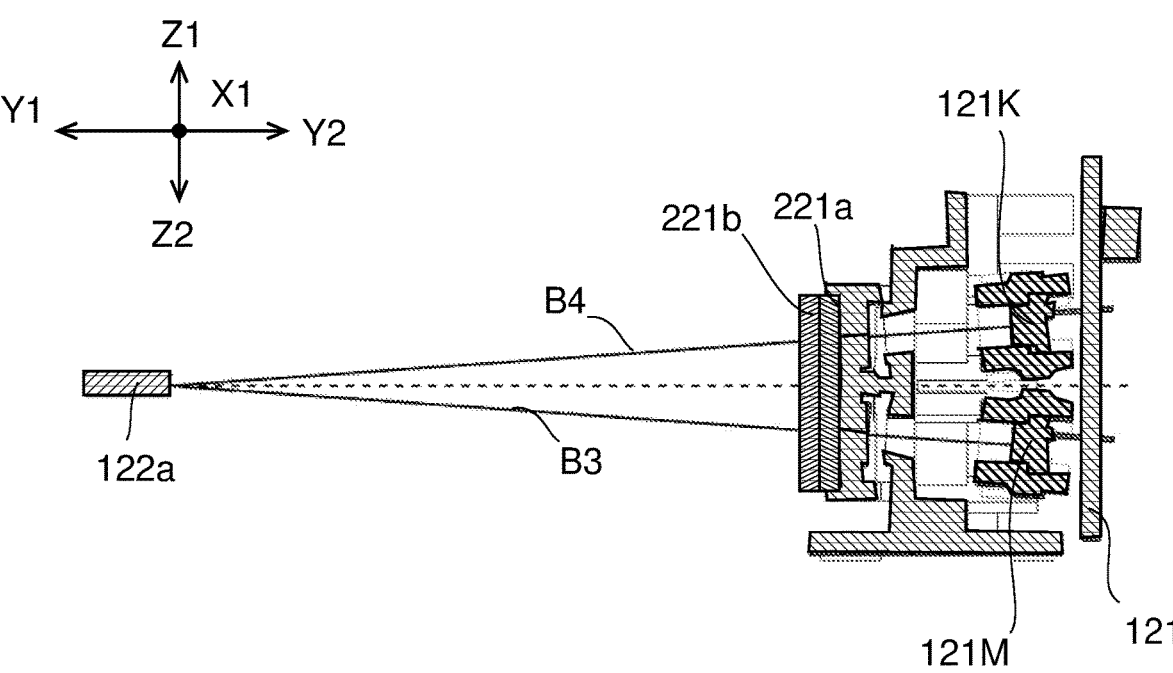
FIG. 4 is a sectional view showing part of the optical scanning device 12 according to the first embodiment of the present disclosure.
Figure 5:
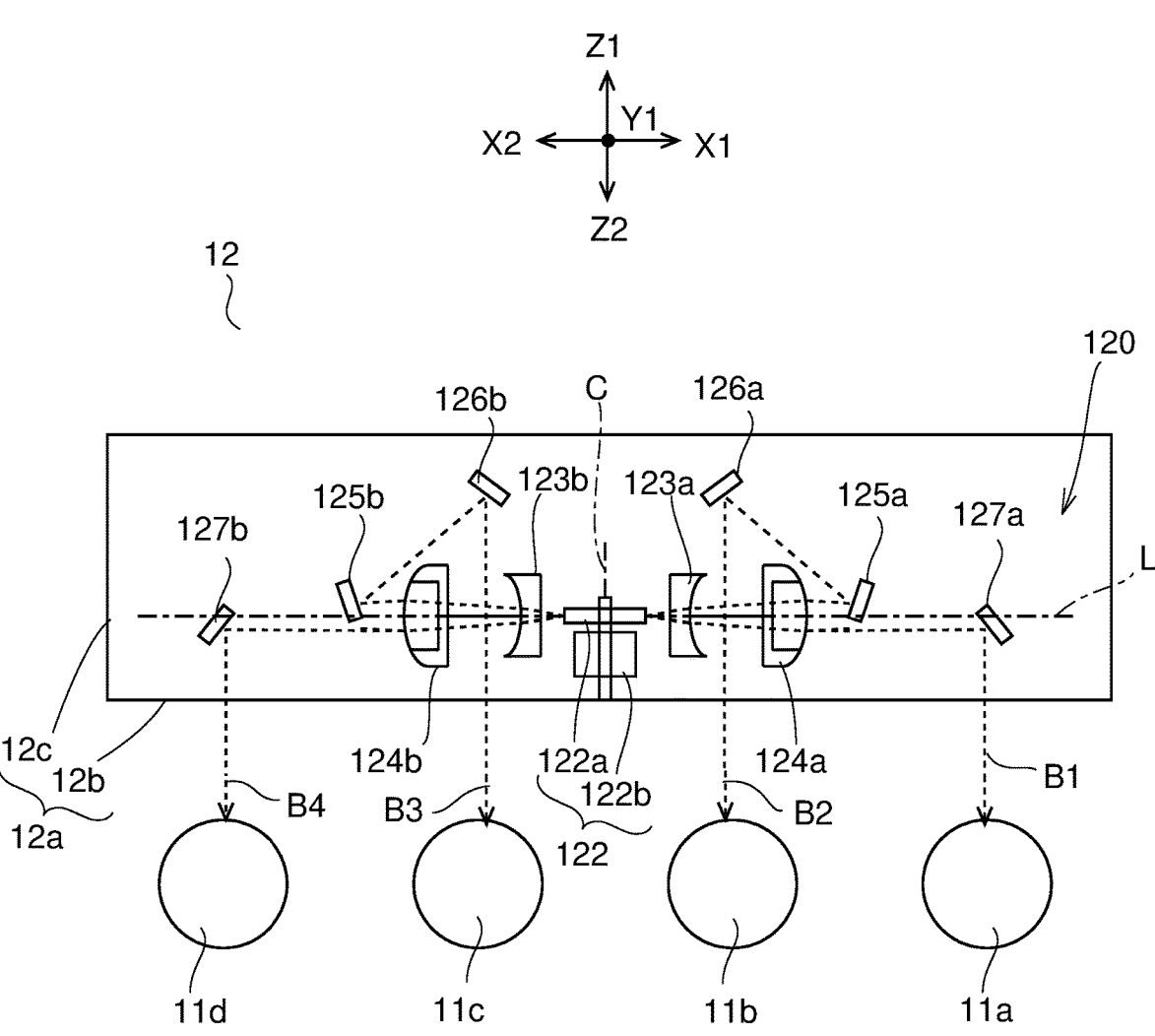
FIG. 5 is an optical path diagram of the optical scanning device 12 according to the first embodiment of the present disclosure.

Next, with reference to FIGS. 2 to 6, a description will be given of the optical scanning device 12. FIG. 2 is a perspective view of the optical scanning device 12, and FIG. 3 is a perspective view showing part of the optical scanning device 12. FIG. 4 is an optical path diagram showing a configuration of the optical scanning device 12, on a section in a sub-scanning direction. FIG. 5 is an optical path diagram showing a configuration of the optical scanning device 12, on a section in the sub-scanning direction. In FIG. 5, configurations of the components are shown in a schematic manner, but shapes of, and the positional relationship among, the components are not shown in a strict manner.

In the following description, a main scanning direction (the Y1-Y2 direction) is a direction perpendicular to a rotation axis C of a deflector 122 and to an optical axis L (see FIG. 5) of an optical system. The main scanning direction (the Y1-Y2 direction) coincides with a direction in which rotation shafts of the photosensitive drums 11*a* to 11*d* extend and with the front-rear direction of the image forming apparatus 1. The sub-scanning direction (the Z1-Z2 direction) is a direction parallel to the rotation axis C of the deflector 122, and coincides with the up-down direction of the image forming apparatus 1. Further, a section in the main scanning direction is a section perpendicular to the sub-scanning direction (the Z1-Z2 direction), and a section in the sub-scanning direction is a section perpendicular to the main scanning direction (the Y1-Y2 direction). Further, the left-right direction (the X1-X2 direction) is a direction orthogonal to the main scanning direction (the Y1-Y2) and to the sub scanning direction (the Z1-Z2 direction).

The optical scanning device 12 outputs (applies) a plurality of (in the present embodiment, four) light beams B1 to B4 having been modulated according to image signals to the photosensitive drums 11*a* to 11*d*, to thereby form electrostatic latent images on the photosensitive drums 11*a* to 11*d*.

The optical scanning device 12 has a light source portion 121, the deflector 122, first scanning lenses (scanning lenses) 123*a* and 123*b*, second scanning lenses (scanning lenses) 124*a* and 124*b*, and reflection mirrors 125*a*, 125*b*,

126*a*, 126*b*, 127*a*, and 127*b*. That is, the optical scanning device 12 has the plurality of scanning lenses 123*a*, 123*b*, 124*a*, and 124*b*, and the plurality of reflection mirrors 125*a*, 125*b*, 126*a*, 126*b*, 127*a*, and 127*b*.

The light source portion 121 has light emitting modules 121Y, 121C, 121M, and 121K, a collimator lens 221*a*, and a cylindrical lens 221*b*. The collimator lens 221*a* and the cylindrical lens 221*b* are integral with each other. Thus, the light source portion 121 includes the light emitting modules 121Y, 121C, 121M, and 121K, the collimator lens 221*a*, and the cylindrical lens 221*b*, and is integrally modularized.

In the present embodiment, the light emitting modules 121Y and 121C are arranged on a right side (the X1 direction) of the rotation axis C so as to be aligned in the up-down direction (the Z1-Z2 direction). The light emitting modules 121M and 121K are arranged on a left side (the X2 direction) of the rotation axis C so as to be aligned in the up-down direction (the Z1-Z2 direction). The light emitting module 121C is arranged on a lower side (the Z2 direction) of the light emitting module 121Y. The light emitting module 121M is arranged on a lower side (the Z2 direction) of the light emitting module 121K.

From the plurality of light emitting modules 121Y, 121C, 121M, and 121K, the light beams B1 to B4, each corresponding to one of the colors of Y (yellow), C (cyan), M (magenta), and K (black), are emitted. The light beams B1 to B4 emitted from the light emitting modules 121Y, 121C, 121M, and 121K pass through the collimator lens 221*a* and the cylindrical lens 221*b* to reach the deflector 122.

At this time, the collimator lens 221*a* converts each of the light beams B1 to B4, emitted from the light emitting modules 121Y, 121C, 121M, and 121K, into substantially parallel light in the main-scanning section. The collimator lens 221*a* is formed by integrating four regions each corresponding to one of the light beams B1 to B4. Thus, the single collimator lens 221*a* can deal with the plurality of light beams B1 to B4. The cylindrical lens 221*b* converges the light beams B1 to B4 in the sub-scanning direction (the Z1-Z2 direction), and collects them each to the vicinity of a deflection surface (a reflection surface) of the deflector 122. As a result, in the vicinity of the deflection surface of the deflector 122, the light beams B1 to B4 each form a linear image. The cylindrical lens 221*b* is formed by integrating four regions corresponding to the light beams B1 to B4. Thus, the single cylindrical lens 221*b* can deal with the plurality of light beams B1 to B4.

In a case where the collimator lens 221*a* is formed of four separate regions corresponding to the light beams B1 to B4, and the cylindrical lens 22*b* is formed of four separate regions corresponding to the light beams B1 to B4, the separate collimator lenses may each be integrated with one of the separate cylindrical lenses.

The deflector 122 is a polygon mirror scanner, having a polygon mirror 122*a* and a scanner motor 122*b*. The scanner motor 122*b* causes the polygon mirror 122*a* to rotate about the rotation axis C.

The polygon mirror 122*a* is composed of a plurality of reflection surfaces. In the present embodiment, the polygon mirror 122*a* is a multi-surface mirror having a quadrangular prism shape. The light beams B1 and B2 incident on the polygon mirror 122*a* are deflected and scanned by one of the reflection surfaces driven to rotate, and are directed to the first scanning lens 123*a* and the second scanning lens 124*a*. The light beams B3 and B4 incident on the polygon mirror 122*a* are deflected and scanned by one of the reflection surfaces driven to rotate, and are directed to the first scanning lens 123*b* and the second scanning lens 124*b*.

At this time, the light beams B1 and B4 are each incident from an upper side (the Z1 direction) obliquely with respect to a normal direction of one deflection surface of the polygon mirror 122a, and are reflected obliquely toward a lower side (the Z2 direction). On the other hand, the light beams B2 and B3 are each incident from a lower side (the Z2 direction) obliquely with respect to a normal direction of one deflection surface, and are reflected obliquely toward an upper side (the Z1 direction).

As the polygon mirror 122a rotates, the light beams B1 to B4 scan scanned surfaces (circumferential surfaces) of the photosensitive drums (image carriers) 11a to 11d in the main scanning direction (the Y1-Y2 direction). Further, as the photosensitive drums 11a to 11d rotate, the light beams B1 to B4 perform scanning in the sub-scanning direction (the Z1-Z2 direction) to form electrostatic latent images on the surfaces of the photosensitive drums 11a to 11d.

Specifically, the light beams B1 and B2 are reflected from a reflection surface of the polygon mirror 122a rightward (the X1 direction) to be directed into the first scanning lens 123a and the second scanning lens 124a. The light beams B3 and B4 are reflected from a reflection surface of the polygon mirror 122a leftward (the X2 direction) to be directed into the first scanning lens 123b and the second scanning lens 124b (see FIG. 5).

The second scanning lenses 124a and 124b are respectively disposed downstream of the first scanning lenses 123a and 123b in the optical paths of the light beams B1 to B4.

The first scanning lenses 123a and 123b and the second scanning lenses 124a and 124b collect each of the light beams B1 to B4 reflected and deflected by the deflector 122 on the scanned surface of a corresponding one of the photosensitive drums 11a to 11d, to thereby form beam spots. Further, each of the light beams B1 to B4 collected on the scanned surface of the corresponding one of the photosensitive drums 11a to 11d performs constant-speed scanning on the scanned surface of the corresponding one of photosensitive drums 11a to 11d.

The first scanning lenses 123a and 123b are each a lens having a distortion (fθ characteristics), a long lens extending along the main scanning direction (the Y1-Y2 direction). The first scanning lens 123a is disposed on a right side (the X1 direction) of the polygon mirror 122a. The first scanning lens 123b is disposed on a left side (the X2 direction) of the polygon mirror 122a. The first scanning lenses 123a and 123b collect each of the light beams B1 to B4 reflected by the deflection surfaces of the polygon mirror 122a.

Similarly to the first scanning lenses 123a and 123b, the second scanning lenses 124a and 124b are each a lens having a distortion (fθ characteristics), a long lens extending along the main scanning direction (the Y1-Y2 direction). The second scanning lens 124a is disposed on a right side (the X1 direction) of the first scanning lens 123a. The second scanning lens 124a collects the light beams B1 and B2 having passed through the first scanning lens 123a to cause them each to form an image on the scanned surface of the corresponding one of the photosensitive drums 11a and 11b.

The second scanning lens 124b is disposed on a left side (the X2 direction) of the first scanning lens 123b. The second scanning lens 124b collects the light beams B3 and B4 having passed through the first scanning lens 123b to cause them each to form an image on the scanned surface of a corresponding one of the photosensitive drums 11c and 11d.

Figure 6:
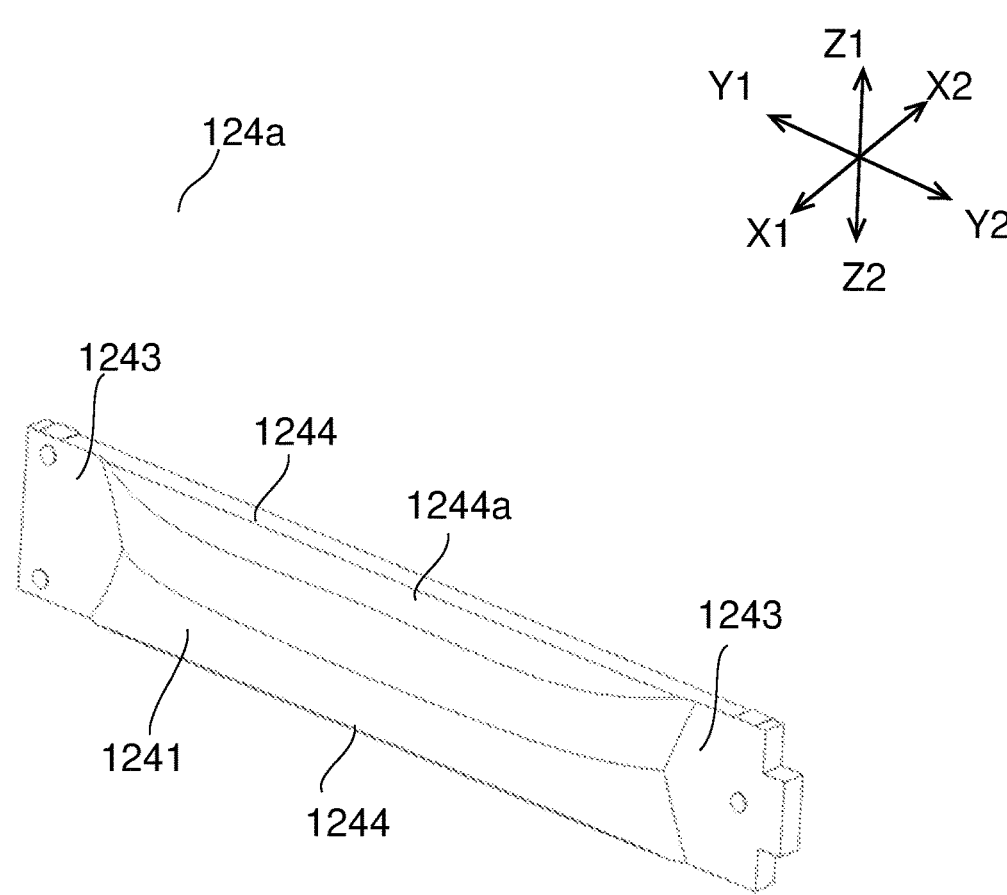
FIG. 6 is a perspective view of a second scanning lens 124a of the optical scanning device 12 according to the first embodiment of the present disclosure.
Figure 7:
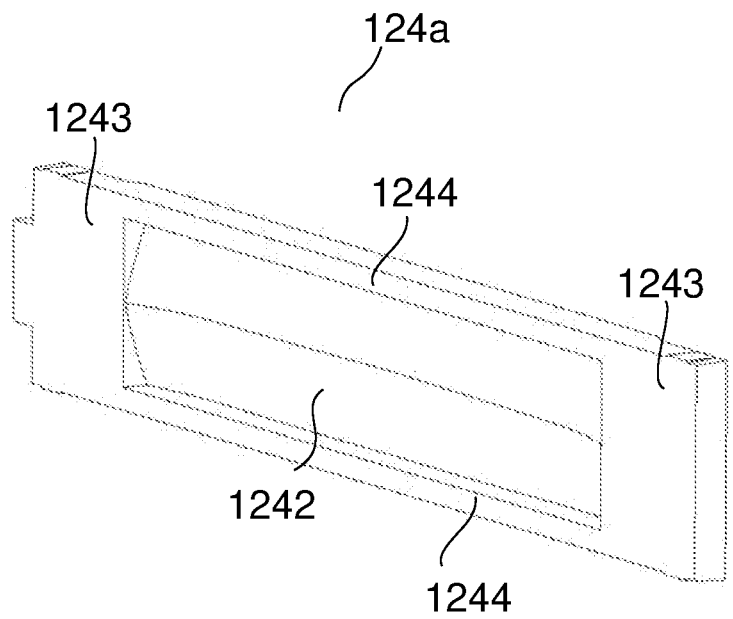
FIG. 7 is a perspective view of the second scanning lens 124a of the optical scanning device 12 according to the first embodiment of the present disclosure.
Figure 8:
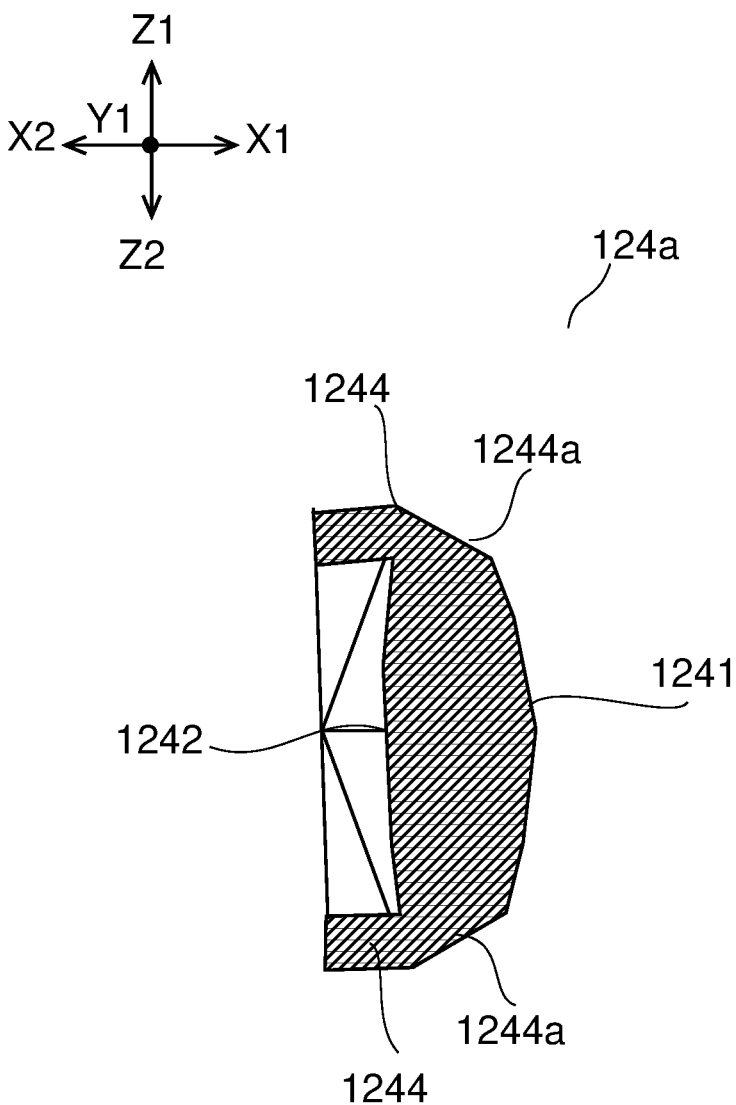
FIG. 8 is a sectional view of the second scanning lens 124a of the optical scanning device 12 according to the first embodiment of the present disclosure.

FIG. 6 and FIG. 7 are perspective views of the second scanning lens 124a, and FIG. 6 is a diagram showing the second scanning lens 124a as seen from the side of an exit surface 1241 of the second scanning lens 124a. FIG. 7 is a diagram showing the second scanning lens 124a as seen from the side of an entrance surface 1242 of the second scanning lens 124a. FIG. 8 is a sectional view of the second scanning lens 124a orthogonal to the main scanning direction.

The second scanning lens 124b is identical to the second scanning lens 124a in shape, and thus descriptions thereof will be omitted.

The second scanning lens 124a has connection portions 1243 and ribs 1244. The connection portions 1243 are disposed one on each of opposite end parts of the second scanning lens 124a in the main scanning direction (the Y1-Y2 direction) so as to extend in the sub-scanning direction (the Z1-Z2 direction). The connection portions 1243 are fixed to peripheral wall portions of the casing 12a of the optical scanning device 12 (see FIG. 2).

The ribs 1244 are disposed one at each of opposite end parts of the second scanning lens 124a in the sub-scanning direction (the Z1-Z2 direction) so as to extend in the main scanning direction (the Y1-Y2 direction). The connection portions 1243 and the ribs 1244 are formed as ejector portions with which to eject the second scanning lens 124a when molding the second scanning lens 124a of a resin material using a mold. The provision of the connection portions 1243 and the ribs 1244 makes it possible to easily remove the large-sized second scanning lens 124a from the mold even if it is enlarged, and thus to improve the production efficiency of the second scanning lens 124a to reduce the production cost thereof.

In the second scanning lens 124a, in a region surrounded by the connection portions 1243 and the ribs 1244, the exit surface 1241 and the entrance surface 1242 for the light beams B1 and B2 are formed. That is, in the second scanning lens 124a, the exit surface 1241 and the entrance surface 1242 constitute a lens body, while the connection portions 1243 and the ribs 1244 do not. The connection portions 1243 and the ribs 1244 do not interfere with the optical paths of the light beams B1 and B2.

That is, the ribs 1244 are formed one on each of opposite sides outward of the exit surface 1241 for the light beams B1 and B2 in the sub-scanning direction (the Z1-Z2 direction), and extend in the main scanning direction (the Y1-Y2 direction).

Further, the rib 1244 that is disposed on the upper side (one side (Z1 direction side) in the sub-scanning direction) of the exit surface 1241 for the light beams B1 and B2 so as to extend in the main scanning direction has, on the side of the exit surface 1241 for the light beams B1 and B2, an inclined surface 1244a that is inclined in a direction toward the first scanning lens 123a toward the upper side (one side (Z1 direction side) in the sub-scanning direction). Further, in the present embodiment, the inclined surface 1244a is also formed in the rib 1244 that is disposed on the lower side (the other side (Z2 direction side) in the sub-scanning direction) of the exit surface 1241, but it may be omitted.

The reflection mirror 127a reflects the light beam B1. The reflection mirrors 125a and 126a reflect the light beam B2. The reflection mirrors 125b and 126b reflect the light beam B3. The reflection mirror 127b reflects the light beam B4.

The light beam B1 collected by the first scanning lens 123a and the second scanning lens 124a is reflected by the reflection mirror 127a to form an image on the scanned surface of the photosensitive drum 11a.

The light beam B2 collected by the first scanning lens 123a and the second scanning lens 124a is reflected by the reflection mirrors 125a and 126a to form an image on the scanned surface of the photosensitive drum 11b. At this time, the light beam B2 reflected by the reflection mirror 125a is allowed to pass near the second scanning lens 124a along the inclined surface 1244a. As a result, the optical path of the light beam B2 can be made shorter to improve the compactness of the scanning optical system 120.

The light beam B3 collected by the first scanning lens 123b and the second scanning lens 124b is reflected by the reflection mirrors 125b and 126b to form an image on the scanned surface of the photosensitive drum 11c. At this time, the light beam B3 reflected by the reflection mirror 125b is allowed to pass near the second scanning lens 124b along the inclined surface 1244a. As a result, the optical path of the light beam B3 can be made shorter to improve the compactness of the scanning optical system 120.

The light beam B4 collected by the first scanning lens 123b and the second scanning lens 124b is reflected by the reflection mirrors 127b to form an image on the scanned surface of the photosensitive drum 11d.

As described above, the light beam B1 is applied to the photosensitive drum 11a according to input of Y (yellow) image data, to form an electrostatic latent image on the photosensitive drum 11a which is an image carrier. The light beam B2 is applied to the photosensitive drum 11b according to input of C (cyan) image data, to form an electrostatic latent image on the photosensitive drum 11b which is an image carrier. The light beam B3 is applied to the photosensitive drum 11c according to input of M (magenta) image data, to form an electrostatic latent image on the photosensitive drum 11c which is an image carrier. The light beam B4 is applied to the photosensitive drum 11d according to input of K (black) image data, to form an electrostatic latent image on the photosensitive drum 11d which is an image carrier.

According to the present embodiment, the photosensitive drum (an image carrier) 11b is disposed on the lower side (the other side (the Z2 direction side) in the sub-scanning direction) of the optical axis L of the second scanning lens 124a, and a pair of the reflection mirrors 125a and 126a are disposed on the upper side (the one side (the Z1 direction side) in the sub-scanning direction) of the optical axis L of the second scanning lens 124a. The light beam B2 reflected on the pair of the reflection mirrors 125a and 126a passes between the first scanning lens 123a and the second scanning lens 124a to travel toward the photosensitive drum (an image carrier) 11b. By using the reflection mirrors 125a and 126a for the light beam B2 collected by the second scanning lens 124a to form an image on the circumferential surface of the photosensitive drum (an image carrier) 11b, it is possible to reduce the number of reflection mirrors to make the scanning optical system 120 for the light beam B2 compact. As a result, the optical scanning device 12 can be made compact.

Further, the second scanning lens 124a has the rib 1244 that extends in the main scanning direction (the Y1-Y2 direction) on the upper side (the one side (the Z1 direction side) in the sub-scanning direction) of the exit surface 1241 for the light beam B2, and the rib 1244 has, on the side of the exit surface 1241 for the light beam B2, the inclined surface 1244a that is inclined in the direction toward the first scanning lens 123a toward the upper side (the one side (the Z1 direction side) in the sub-scanning direction). As a result, the light beam B2 reflected by the reflection mirror 126a is allowed to pass near the second scanning lens 124a along the inclined surface 1244a. Thus, it is possible to make the optical path of the light beam B2 shorter to improve the compactness of the scanning optical system 120.

Further, the light source portion 121 includes the collimator lens 221a and the cylindrical lens 221b which are integral with each other. This makes it possible to make the optical paths of the light beams B1, B2, B3, and B4 shorter to improve the compactness of the scanning optical system 120.

It should be understood that the embodiment described above is in no way meant to limit the present disclosure, which thus allows for many modifications and variations within the spirit of the present disclosure. For example, in the above embodiment, a tandem-type color printer is dealt with as an example of the image forming apparatus 1, but application of the present disclosure is not limited to color printers, and the present disclosure is applicable to other types of image forming apparatuses employing an electrophotographic method, such as color copiers, facsimile machines, etc.

Further, in the present embodiment, the optical scanning device 12 is disposed on the upper side Z1 of the photosensitive drums 11a to 11d, but the optical scanning device 12 may be disposed on the lower side Z2 of the photosensitive drums 11a to 11d, instead. In that case, the light beams B1 to B4 emitted from the scanning optical system 120 travel toward the upper side Z1. Here, by forming, in the rib 1244 of the second scanning lens 124a that extends in the main scanning direction (the Y1-Y2 direction) on the lower side (the other side (the Z2 direction side) in the sub-scanning direction) of the exit surface 1241 for the light beam B2, an inclined surface that is inclined in the direction toward the first scanning lens 123a toward the lower side (the other side (the Z2 direction side) in the sub-scanning direction), the optical path of the light beam B2 can be made shorter to improve the compactness of the scanning optical system 120.

Second Embodiment

Figure 9:
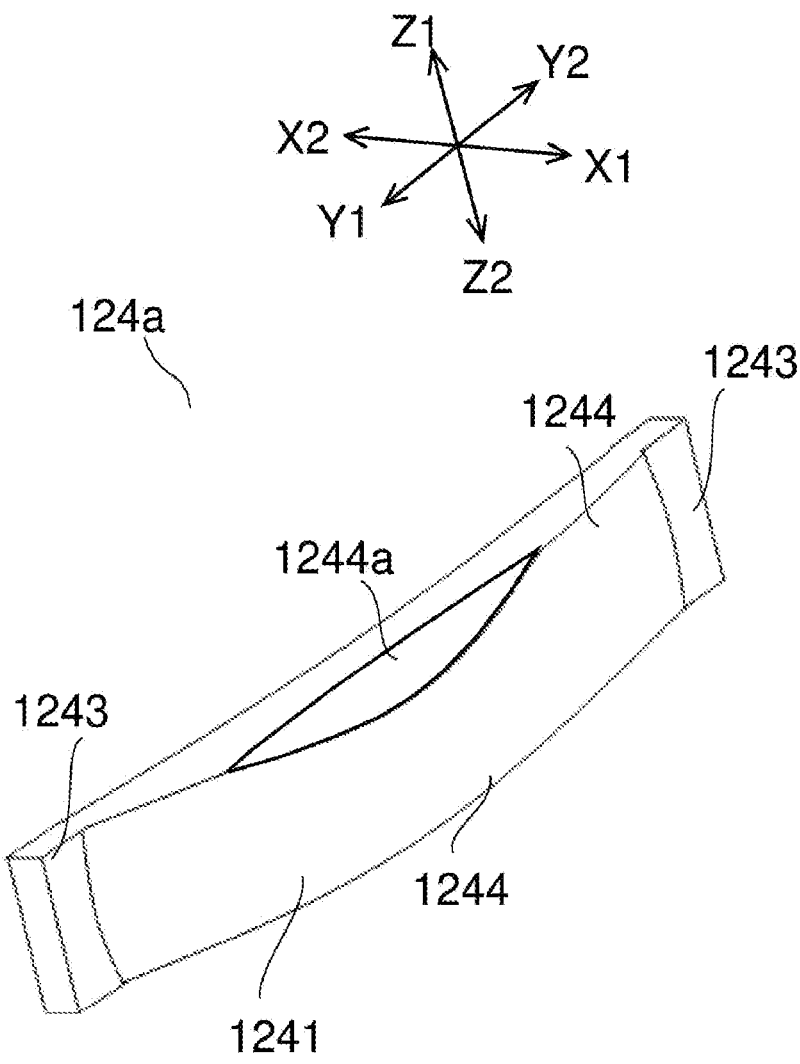
FIG. 9 is a perspective view of a second scanning lens 124a of an optical scanning device 12 according to a second embodiment of the present disclosure.
Figure 10:
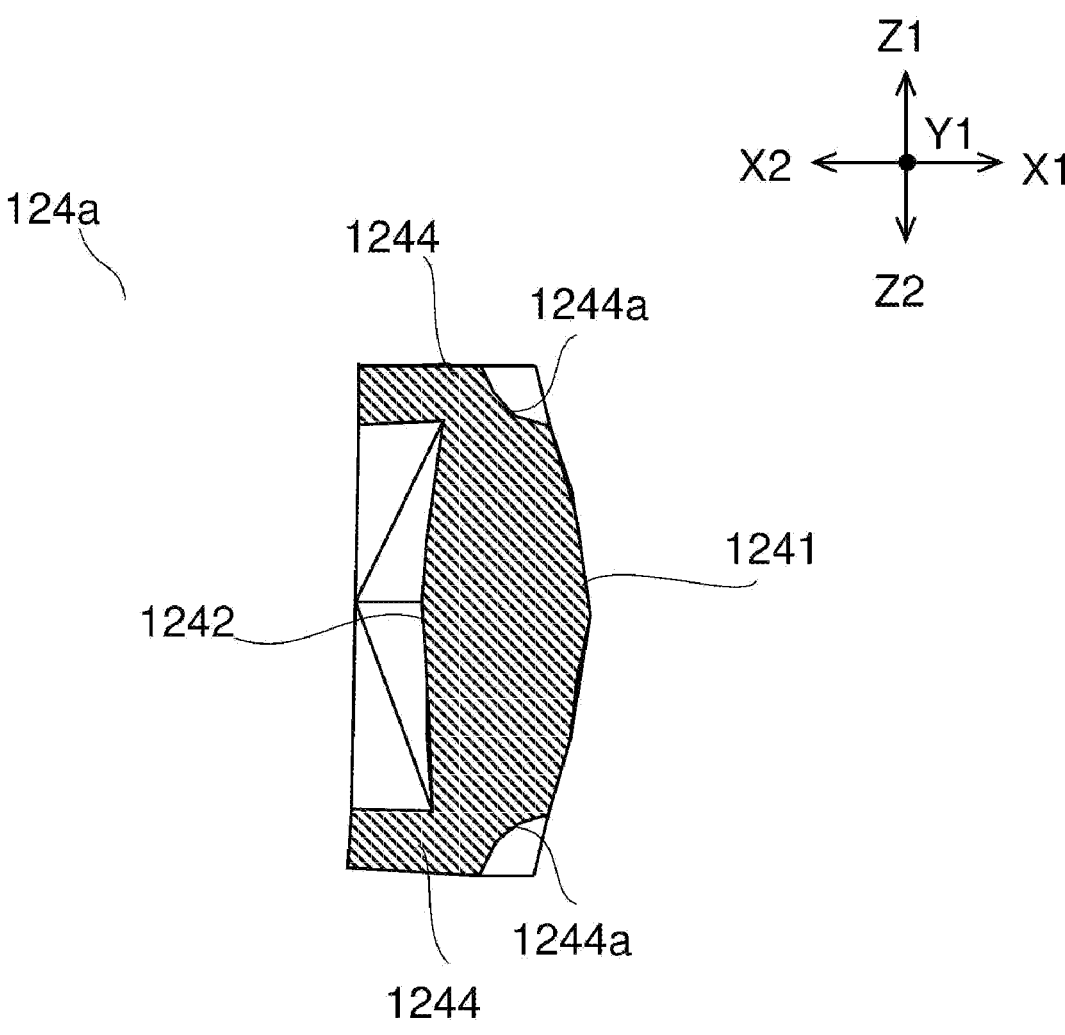
FIG. 10 is a sectional view of the second scanning lens 124a of the optical scanning device 12 according to the second embodiment of the present disclosure.

Next, a second embodiment of the present disclosure will be described. FIG. 9 is a perspective view of a second scanning lens 124a according to the second embodiment, and FIG. 10 is a sectional view of the second scanning lens 124a orthogonal to the main scanning direction. A second scanning lens 124b is identical to the second scanning lens 124a in shape, and thus descriptions thereof will be omitted. For convenience of description, the same reference signs are given to the same components as those in the first embodiment shown in FIG. 1 to FIG. 8 referred to above. The second embodiment is different from the first embodiment in that the second scanning lens 124a has formed therein a depression portion instead of the inclined surface 1244a. The other components are similar to those in the first embodiment.

Further, the rib 1244 that extends in the main scanning direction on the upper side (the one side Z1 in the sub-scanning direction) of the exit surface 1241 of the second scanning lens 124a for the light beams B1 and B2, in an end part thereof on the side of the exit surface 1241 for the light beams B1 and B2, has a depression portion 1244b where an upper end surface thereof (an end surface on the one side Z1 in the sub-scanning direction) is curvedly depressed toward a lower side (the other side Z2 in the sub-scanning direction). Further, in the present embodiment, the depression portion 1244b is also formed in the rib 1244 that is disposed on the lower side (the other side (the Z2 direction side) in the sub-scanning direction) of the exit surface 1241, but it may be omitted. The depression portion 1244b is curvedly depressed, and this helps suppress reduction of rigidity of the second scanning lens 124a.

Further, the depression portion 1244b has the largest depression width at a central part thereof in the main scanning direction (the Y1-Y2 direction). The second scanning lens 124a has a greater thickness in the left-right direction (the X1-X2 direction) at a center part thereof in the main scanning direction (the Y1-Y2 direction) than at opposite end parts thereof in the main scanning direction (the Y1-Y2 direction), and thus, even if the depression portion 1244b is formed with the largest depression width at the central part in the main scanning direction (the Y1-Y2 direction), reduction in rigidity of the second scanning lens 124a can be suppressed.

The light beam B2 collected by the first scanning lens 123a and the second scanning lens 124a is reflected by the reflection mirrors 125a and 126a to form an image on the scanned surface of the photosensitive drum 11b. At this time, the light beam B2 reflected by the reflection mirror 125a is allowed to pass near the second scanning lens 124a along the depression portion 1244b. This makes it possible to make the optical path of the light beam B2 shorter to improve the compactness of the scanning optical system 120, without increasing the number of reflection mirrors, suppressing increase in production cost.

The light beam B3 collected by the first scanning lens 123b and the second scanning lens 124b is reflected by the reflection mirrors 125b and 126b to form an image on the scanned surface of the photosensitive drum 11c. At this time, the light beam B3 reflected by the reflection mirror 125b is allowed to pass near the second scanning lens 124b along the depression portion 1244b. This makes it possible to make the optical path of the light beam B3 shorter to improve the compactness of the scanning optical system 120, without increasing the number of reflection mirrors, suppressing increase in production cost.

As described above, the light beam B1 is applied to the photosensitive drum 11a according to input of Y (yellow) image data to form an electrostatic latent image on the photosensitive drum 11a which is an image carrier. The light beam B2 is applied to the photosensitive drum 11b according to input of C (cyan) image data to form an electrostatic latent image on the photosensitive drum 11b which is an image carrier. The light beam B3 is applied to the photosensitive drum 11c according to input of M (magenta) image data to form an electrostatic latent image on the photosensitive drum 11c which is an image carrier. The light beam B4 is applied to the photosensitive drum 11d according to input of K (black) image data to form an electrostatic latent image on the photosensitive drum 11d which is an image carrier.

According to the present embodiment, the light beam B2 is incident on a deflection surface of the deflector 122 from the sub-scanning direction (the Z1-Z2 direction) obliquely with respect to the normal direction of the deflection surface, and the second scanning lens (a scanning lens) 124a has the ribs 1244 that are formed outward of the exit surface 1241 for the light beam B2 in the sub-scanning direction (the Z1-Z2 direction) so as to extend in the main scanning direction (the Y1-Y2 direction). The ribs 1244 each have, in the end part thereof on the side of the exit surface 1241 for the light beams B1 and B2, the depression portion 1244b where the end surface thereof in the sub-scanning direction (the Z1-Z2 direction) is curvedly depressed. This allows the light beam B2 having been reflected by the reflection mirror 125a to pass near the second scanning lens 124a along the depression portion 1244b. Thus, it is possible to make the optical path of the light beam B2 shorter to improve the compactness of the scanning optical system 120, without increasing the number of reflection mirrors, suppressing increase in production cost.

It should be understood that the embodiment described above is in no way meant to limit the present disclosure, which thus allows for many modifications and variations within the spirit of the present disclosure. For example, in the embodiment described above, the depression portions 1244b are formed only in the second scanning lenses 124a and 124b, but the depression portions 1244b may also be formed in the first scanning lenses 123a and 123b.

The present disclosure is usable in an optical scanning device that forms an electrostatic latent image by irradiating an image carrier with light. The use of the present disclosure makes it possible to provide an optical scanning device that can be made compact, and an image forming apparatus provided therewith.

What is claimed is:

1. An optical scanning device, comprising:
   a light source portion in which a plurality of light emitting modules that each emit a light beam are disposed in a sub-scanning direction;
   a deflector that rotates about an axis to reflect the light beam having been emitted from the light source portion so as to cause the light beam to scan a circumferential surface of an image carrier in a main scanning direction;
   a first scanning lens that collects the light beam having been reflected by the deflector;
   a second scanning lens that causes the light beam having passed through the first scanning lens to form an image on the circumferential surface of the image carrier; and
   a pair of reflection mirrors that, on an image formation optical path of the light beam, reflect the light beam having passed through the second scanning lens toward the image carrier,
   wherein
   the light beam having been reflected by the pair of reflection mirrors passes between the first scanning lens and the second scanning lens to travel toward the image carrier,
   the second scanning lens has, on one side of an exit surface thereof for the light beam in the sub-scanning direction, a rib extending in the main scanning direction, and
   the rib has, on a side of the exit surface for the light beam, an inclined surface that is inclined in a direction toward the first scanning lens toward one side in the sub-scanning direction.

2. The optical scanning device according to claim 1, wherein
   the light source portion has
   a collimator lens that substantially collimates each of the light beams having been emitted from the light emitting modules, and
   a cylindrical lens that converges each of the light beams having passed through the collimator lens in a sub-scanning direction, and
   the collimator lens and the cylindrical lens are integral with each other.

3. The optical scanning device according to claim 1, wherein
   the light source portion has
   a collimator lens that substantially collimates each of the light beams having been emitted from the light emitting modules, and a cylindrical lens that converges each of the light beams having passed through the collimator lens in a sub-scanning direction, the collimator lens is formed by integrating sections each corresponding to one of the light beams, and the cylindrical lens is formed by integrating sections each corresponding to one of the light beams.

4. The optical scanning device according to claim 2, wherein the collimator lens is formed by integrating sections each corresponding to one of the light beams, and the cylindrical lens is formed by integrating sections each corresponding to one of the light beams.

5. An optical scanning device, comprising:

a light source portion in which a plurality of light emitting modules that each emit a light beam are disposed in a sub-scanning direction;

a deflector that has a deflection surface for reflecting the light beam having been emitted from the light source portion, and that rotates about an axis so as to cause the light beam to scan a circumferential surface of an image carrier in a main scanning direction;

a plurality of scanning lenses that extend in the main scanning direction, and that cause the light beam having been reflected by the deflector to form an image on the circumferential surface of the image carrier; and a plurality of reflection mirrors that, on an image formation optical path of the light beam, reflect the light beam having passed through the scanning lenses toward the image carrier, wherein the light beam is incident on the deflection surface from the sub-scanning direction obliquely with respect to a normal direction of the deflection surface, at least one of the scanning lenses has a rib that is formed outward of an exit surface thereof for the light beam in the sub-scanning direction so as to extend in the main scanning direction, and the rib has, in an end part thereof on a side of the exit surface for the light beam, a depression portion where an end surface thereof in the sub-scanning direction is curvedly depressed, a bottom surface of the depressed portion being inclined in a direction toward a side of an entrance surface for the light beam toward one side in the sub-scanning direction.

6. The optical scanning device according to claim 5, wherein the depression portion has a largest depression width at a central part thereof in the main scanning direction.

7. The optical scanning device according to claim 5, wherein the rib includes ribs formed one on each of opposite sides outward of the exit surface for the light beam in the sub-scanning direction, and the depression portion is formed in each of the ribs.

8. An image forming system, comprising:

the optical scanning device according to claim 1;

the image carrier; and an image forming portion that forms, on a sheet, an image corresponding to an electrostatic latent image formed on the image carrier.

9. An image forming system, comprising:

the optical scanning device according to claim 5;

the image carrier; and an image forming portion that forms, on a sheet, an image corresponding to an electrostatic latent image formed on the image carrier.

* * * * *